United States Patent
Barrenscheen et al.

(10) Patent No.: US 8,615,618 B2
(45) Date of Patent: Dec. 24, 2013

(54) SYSTEM AND METHOD OF TRANSMITTING DATA BETWEEN DEVICES CONNECTED VIA A BUS DEFINING A TIME SLOT DURING TRANSMISSION FOR RESPONSIVE OUTPUT INFORMATION FROM BUS DEVICES

(71) Applicant: Infineon Technologies AG, Munich (DE)

(72) Inventors: Jens Barrenscheen, München (DE); Wilhard Von Wendorff, München (DE)

(73) Assignee: Infineon Technology AG, Munich (DE)

( * ) Notice: Subject to any disclaimer, the term of this patent is extended or adjusted under 35 U.S.C. 154(b) by 0 days.

(21) Appl. No.: 13/693,717

(22) Filed: Dec. 4, 2012

(65) Prior Publication Data

US 2013/0097347 A1 Apr. 18, 2013

Related U.S. Application Data

(63) Continuation of application No. 13/544,578, filed on Jul. 9, 2012, now Pat. No. 8,341,320, which is a continuation of application No. 09/883,817, filed on Jun. 18, 2001, now Pat. No. 8,219,730.

(30) Foreign Application Priority Data

Jun. 16, 2000 (DE) .................................. 100 29 834

(51) Int. Cl.
*G06F 13/36* (2006.01)

(52) U.S. Cl.
USPC .......................................... 710/117; 370/498

(58) Field of Classification Search
USPC ........................... 370/498; 710/100, 117–118
See application file for complete search history.

(56) References Cited

U.S. PATENT DOCUMENTS

| 4,896,151 | A | 1/1990 | Kuranami et al. |
|---|---|---|---|
| 5,032,633 | A | 7/1991 | Schlobohm et al. |
| 5,293,571 | A | 3/1994 | Matsuda et al. |
| 6,212,633 | B1 | 4/2001 | Levy et al. |
| 6,347,097 | B1 | 2/2002 | Deng |
| 6,353,615 | B1 | 3/2002 | Bohne |
| 8,219,730 | B2 | 7/2012 | Barrenscheen et al. |
| 2002/0141418 | A1 | 10/2002 | Ben-Dor et al. |
| 2002/0196806 | A1 | 12/2002 | Ghodrat et al. |

FOREIGN PATENT DOCUMENTS

| DE | 19510280 A1 | 9/1995 |
|---|---|---|
| DE | 19620137 A1 | 11/1997 |
| DE | 19721740 A1 | 11/1998 |
| EP | 0395495 A1 | 10/1990 |
| GB | 2288518 A | 10/1995 |

OTHER PUBLICATIONS

IEEE 1394 Serial Bus Controller, Nov. 1996, Fujitsu.

*Primary Examiner* — Clifford Knoll

(74) *Attorney, Agent, or Firm* — Laurence A. Greenberg; Werner H. Stemer; Ralph E. Locher

(57) ABSTRACT

Techniques and devices for transmitting data and information via a bus are provided. According to these techniques, data is transmitted in units or frames together with information that is required or useful for one or more of the transmission and the use of the data. If desired, at least some of the units or frames include a time slot within which freely selectable devices can output onto the bus data representing freely selectable information at freely selectable points in time.

26 Claims, 1 Drawing Sheet

| SYN | ID | CTRL | DATA | CRC | REPLY |

SYSTEM AND METHOD OF TRANSMITTING DATA BETWEEN DEVICES CONNECTED VIA A BUS DEFINING A TIME SLOT DURING TRANSMISSION FOR RESPONSIVE OUTPUT INFORMATION FROM BUS DEVICES

CROSS-REFERENCE TO RELATED APPLICATIONS

The present application is a continuation of co-pending U.S. patent application Ser. No. 13/544,578, filed on Jul. 9, 2012, entitled "System And Method Of Transmitting Data Between Devices Connected Via A Bus Defining A Time Slot During Transmission For Responsive Output Information From Bus Devices", which is a continuation of U.S. patent application Ser. No. 09/883,817, filed on Jun. 18, 2001, now U.S. Pat. No. 8,219,730, entitled "Method Of Transmitting Data Between Devices Connected Via A Multi-Master Bus Defining A Time Slot During Transmission For Responsive Output Information From Non-Bus Master Devices", and claims priority from German Patent Application No. DE 10 029 834.6, filed on Jun. 16, 2000; those applications being incorporated herein, by reference, in their entireties.

BACKGROUND OF THE INVENTION

Field of the Invention

The present invention relates to a method of transmitting data between devices that are connected via a bus, and to a device that can be connected to other devices via a bus.

Such methods and devices have been known for many years in numerous embodiments, and therefore do not require any more detailed explanation.

A possible design of a system in which a plurality of devices are connected via a bus is illustrated schematically in FIG. 1. Here, the devices which are to be connected are designated by the reference symbols N1, N2, ... Nn, and the bus interconnecting these devices is designated by the reference symbol BUS.

In the system shown in FIG. 1, in principle any of the devices N1, N2, ... Nn can transmit data to any other device via the bus BUS.

A known problem with data transmissions between devices which are connected to one another via a bus is that the intention is that the transmission of data should take place very quickly and efficiently, but that, on the other hand, it must also be ensured that the data to be transmitted arrives in a fault-free condition.

In the prior art it has not been possible to solve this problem in a completely satisfactory way: either the transmission of data is very fast, but the price to be paid is that it is not reliable under all circumstances; or else, the transmission of data is very reliable, but the price to be paid is that it is not so fast.

SUMMARY OF THE INVENTION

The object of the present invention is to provide a method for transmitting data between bus-connected devices and a device that is connectible to other devices via a bus, which overcomes the above-noted deficiencies and disadvantages of the prior art devices and methods of this general kind, and which enables data transmission that is, on the one hand, very fast and efficient and in which, on other hand, it is possible to ensure that the data to be transmitted arrive at the target in a fault-free condition.

With the above and other objects in view there is provided, in accordance with the invention, a method of transmitting data between devices interconnected via a bus, which comprises:

transmitting, in units, data and information concerning at least one of a transmission and a use of the data, from a first device to at least one second device;

forming the units at least partly with at least one region defining a given time slot within which the at least one second device outputs onto the bus specific information and/or data; and defining, in the at least one second device configured to output information and/or data within the given time slot, acknowledging whether or not the data from the first device have been received by the at least one second device in a fault-free condition within the given time slot, settings selected from the group consisting of a setting to determine under which conditions information and/or data are to be output within the given time slot, a setting to determine which information and/or data are to be output within the given time slot, and a setting to determine at which points in time within the time slot the information and/or data are to be output.

With the above and other objects in view there is also provided a method of transmitting data between devices interconnected via a bus, which comprises:

transmitting, in units, data and information concerning at least one of a transmission and a use of the data, from a first device to at least one second device;

forming the units at least partly with at least one region defining a given time slot within which the at least one second device can output onto the bus specific information; and defining, at least in specific devices, settings selected from the group consisting of a setting to determine which other devices have to output information and/or data within the given time slot, a setting to determine which information and/or data are to be output within the given time slot by the other devices, and a setting to determine at which points in time within the given time slot the other devices have to output the respective information and/or data.

With the above and other objects in view there is also provided, in accordance with the invention, a device for connection to other devices via a bus, comprising means for transmitting data together with information concerning one of a transmission and a use of the data in units, wherein at least some of the units are formed with at least one region defining a time slot within which the device can output onto the bus information and/or data, and wherein the device contains settings selected from the group consisting of a setting determining under which conditions the device has to output information and/or data within the time slot, a setting determining which information and/or data the device has to output within the time slot, and a setting determining at which points in time within the time slot the information and/or data is to be output.

There is also provided, in accordance with the invention, a device for connection to other devices via a bus, comprising means for transmitting data together with information concerning one of a transmission and a use of the data in units, wherein at least some of the units are formed with at least one region defining a time slot within which one or a plurality of other devices can output onto the bus information and/or data, and wherein the device contains settings selected from the group consisting of a setting determining which other devices output information and/or data within the time slot, a setting determining which information and/or data representing information has to be output within the time slot by the other devices, and a setting determining at which points in time within the time slot the other devices have to output the respective information and/or data.

In other words, the methods and devices disclosed and claimed herein are defined in that: the data to be transmitted from a first device to one or more second devices is transmitted, together with information which is required or useful for the transmission and/or the use of the data, into units, at least some of which comprise at least one region which defines a time slot within which the devices can output onto the bus information and/or data, and that, in the devices which must be able to output data within said time slot, settings are made to determine under which conditions information and/or data is to be output within the time slot, and/or which information and/or data is to be output within the time slot, and/or at which points in time within the time slot the information and/or data is to be output; and/or the data to be transmitted from a first device to one or more second devices is transmitted, together with information which is required or useful for the transmission and/or the use of the data, into units, at least some of which comprise at least one region which defines a time slot within which the devices can output onto the bus information and/or data, and that settings are made, at least in specific devices, to determine which other devices have to output data within the time slot, and/or which information and/or data is to be output within the time slot by the other devices, and/or at which points in time within the time slot the other devices have to output the respective information and/or data; and/or the device is designed in such a way that the data to be transmitted can be transmitted, together with information which is required or useful for the transmission and/or the use of the data, into units, at least some of which comprise at least one region which defines a time slot within which the device can output onto the bus information and/or data, and that settings are made in the device to determine under which conditions it has to output information and/or data within the time slot and/or which information and/or data it has to output within the time slot and/or at which points in time within the time slot the information and/or data is to be output; and/or the device is designed in such a way that the data to be transmitted can be transmitted, together with information which is required or useful for the transmission and/or the use of the data, into units, at least some of which comprise at least one region which defines a time slot within which one or a plurality of other devices can output onto the bus information and/or data, and that settings are made in the device to determine which other devices have to output information and/or data within the time slot, and/or which information and/or data has to be output within the time slot by the other devices and/or at which points in time within the time slot the other devices have to output the respective information and/or data.

Such methods and devices prove advantageous in many ways:

on the one hand because, owing to the individual adjustability of the devices connected to the bus, it is possible, under all circumstances, to obtain reliable information indicating whether or not the devices for which the data to be transmitted is intended have received the data in a fault-free condition, on the other hand, because this information can be obtained directly after the transmission of the data, that is to say for example still in the frame or in the message in which the data to be transmitted is transmitted, on the other hand, if necessary, this information can also be received later, that is to say for example in a frame or in a message in which other data is transmitted, in addition, because there is no necessity to request and/or to transmit the information in one or more separate frames or messages, or—as is the case for example when transmission errors on the CAN bus are displayed—to bring about exceptional circumstances which indicate specific states or events, in addition, because the data can be sent without supplementary information, such as indication of the receiver, of the sender and/or of the significance of the data, owing to the individual adjustability of the devices connected to the bus, and finally, because the information and/or data can be output completely independently of the devices connected to the bus, i.e. without triggering or authorization by a device controlling the bus allocation (without arbitration) owing to the individual adjustability of the devices connected to the bus.

The transmission of data can thus be brought about surprisingly easily and at the same time extremely quickly, efficiently and reliably by means of the claimed methods and the claimed devices.

Any other information can also be received from the devices connected to the bus in an equally simple, fast, efficient and reliable fashion.

Other features which are considered as characteristic for the invention are set forth in the appended claims.

Although the invention is illustrated and described herein as embodied in a method for transmitting data between devices which are connected via a bus, and a device which can be connected to other devices via a bus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
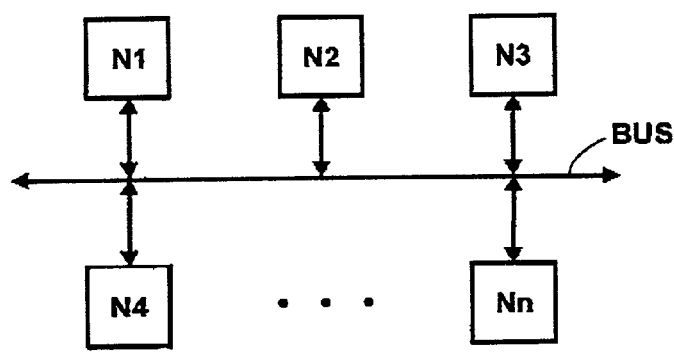
FIG. 1 is structural diagram showing the basic design of a system with devices connected via a bus.

The method described below is used to transmit data between devices which are connected via a bus; the device described below is a device which is suitable for carrying out the method. A possible design of the system in which the method and the device can be used is illustrated in FIG. 1. Reference is had to the introductory text above. It should be understood, however, that that the invention is not limited to the configuration of FIG. 1. The system can also be of any other desired configuration design.

The term "bus" can be understood to be a communications device which is not connection-orientated and via which data can be exchanged optically, electrically or in some other way between devices which are connected to the bus.

In the example in question, each of the devices N1, N2, . . . Nn which are connected to the bus BUS can become bus master; the system is therefore what is referred to as a multi-master bus system. However, there is no restriction to this. The use of the method described above also proves advantageous if just a single device or only a small number of the existing devices can become bus master.

In the present case, the devices N1, N2, . . . Nn which are connected to the bus themselves determine who is bus master. This is carried out, as in the case of the CAN bus, taking into account the data transmitted via the bus; as long as a respective device finds again the data output by it on the bus, it can feel it is the bus master. However, the use of the method described below has also proven advantageous in systems in which the bus master is defined differently, for example by means of a bus controller.

The bus BUS of the system in question is supplied on a standard basis with a potential which represents the level 0 and is changed to a different potential "only" if a bit having the level 1 is to be transmitted via the bus. Because the potential representing the level 0 can be drawn, if necessary, to the potential representing the level 1, bits having the level 1 are designated as dominant bits and bits having the level 0 are designated as recessive bits. It should be apparent that there is no restriction to this. It is, of course, also possible to provide for the bits having level 1 to be the recessive bits and bits having the level 0 to be the dominant bits. The preassignment of a potential representing a specific level to the bus is carried out in the example in question using what is referred to as pull-down resistors or pull-up resistors which can be provided on devices connected to the bus, or elsewhere. The preassignment of a potential representing a specific level to the bus proves advantageous but is not a precondition for the method in question here to be applied.

In the example in question, the bus BUS is configured for a transmission of data which takes place sequentially on a bit-by-bit basis. However, there is not any restriction to this either. The use of the method described below can also prove advantageous if the transmission takes place in parallel or partially in parallel (for example sequentially on a byte-by-byte basis).

The method in question here is distinguished by the fact that:
the data to be transmitted from a first device to one or more second devices is transmitted, together with information which is required or useful for the transmission and/or the use of the data, into units, at least some of which comprise at least one region which defines a time slot within which the devices can output onto the bus information and/or data, and that, in the devices which must be able to output information and/or data within said time slot, settings is made to determine under which conditions data is to be output within the time slot, and/or which information and/or data is to be output within the time slot, and/or at which points in time within the time slot the information and/or data is to be output, and/or
the data to be transmitted from a first device to one or more second devices is transmitted, together with information which is required or useful for the transmission and/or the use of the data, into units, at least some of which comprise at least one region which defines a time slot within which the devices can output onto the bus information and/or data, and that settings are made, at least in specific devices, to determine which other devices have to output information and/or data within the time slot, and/or which information and/or data representing information is to be output within the time slot by the other devices, and/or at which points in time within the time slot the other devices have to output the respective information and/or data.

The device in question here is distinguished by the fact that:
the device is designed in such a way that the data to be transmitted can be transmitted, together with information which is required or useful for the transmission and/or the use of the data, into units, at least some of which comprise at least one region which defines a time slot within which the device can output onto the bus information and/or data, and that settings are made in the device to determine under which conditions it has to output information and/or data within the time slot and/or which information and/or data it has to output within the time slot and/or at which points in time within the time slot the information and/or data is to be output, and/or
the device is designed in such a way that the data to be transmitted can be transmitted, together with information which is required or useful for the transmission and/or the use of the data, into units, at least some of which comprise at least one region which defines a time slot within which one or a plurality of other devices can output onto the bus information and/or data, and that settings are made in the device to determine which other devices have to output information and/or data within the time slot, and/or which information and/or data representing information has to be output within the time slot and/or at which points in time within the time slot the other devices have to output the respective information and/or data.

The aforesaid units in which the data to be transmitted is transmitted together with information that is required or useful for the transmission and/or the use of the data and/or further information, are, for example, the frames or messages which are known from already existing bus systems. However, the frames or messages which are used in the method in question here have a structure different from conventional frames or messages.

In an exemplary embodiment, a first device may be represented by device N1, a second device by N2 to which the data transmitted by N1 does not concern, and a third device by N3 to which the data transmitted by N1 does concern. Devices N4-Nn may be of either the second device type or the third device type depending on whether or not the data transmitted by device N1 is intended for that particular device's use. In one embodiment, the bus is a multi-master bus such that the devices N1-Nn may alternate device types between a first device that transmits data and the second or third devices which may provide an output during the given time slot.

Figure 2:
FIG. 2 is a schematic showing an exemplary embodiment of the format of a message or of a frame, which is used to transmit data in the method described below and in the device described below.

An example of the structure of a frame or a message which is used in the method in question here is illustrated in FIG. 2.

This frame or this message comprises a synchronization field SYN, an identifier field ID, a control field CTRL, a data field DATA, an error detection field CRC, and a reply field REPLY.

The synchronization field SYN, the identifier field ID, the control field CTRL, the data field DATA and the error detection field CRC are filled with data comprising one or more bits in each case, by the device sending the frame or message, and are subsequently—as soon as the respective device can become bus master—output onto the bus sequentially on a bit-by-bit basis. Of these fields, the synchronization field SYN receives a specific bit or a specific bit sequence by means of which the start of a frame or of a message is indicated to the other devices;

the identifier field ID contains one or more bits which specify the type, the contents and/or the receiver of the respective frame or of the respective message;

the control field CTRL contains one or more bits which specify the length of the data field;

the data field DATA contains the data or the message which is actually to be transmitted; and the error detection field CRC contains one or more bits which can be used to detect and/or correct transmission errors.

The reply field REPLY is not filled with data, or at any rate only filled partially with data, by the device sending the frame or the message. This field thus defines a time slot in which the devices which are not bus master can, or must, output data onto the bus. Depending on the length of the time slot defined by the reply field, one or more bits can be transmitted via the bus in that time slot.

The information which is transmitted via the bus in the time slot defined by the reply field can be a very wide range of information, for example:

the signaling from one or more devices connected to the bus that said device or devices has/have received in a fault-free condition the frame or the message of which the reply field is a component (or possibly also a previously transmitted frame or a previously transmitted message or data contained in it), and/or the signaling from one or more devices connected to the bus that said device or devices has/had not received in a fault-free condition the frame or the message of which the reply field is a component (or possibly also a previously transmitted frame or a previously transmitted message or date contained in it), and/or information from one or more of the devices connected to the bus relating to their states (for example relating to the operating mode in which they are in, the utility factor, the temperature etc).

Settings which determine which device has to output which information onto the bus at which point in time are preferably made in the respective devices themselves. As a result, the respective devices can output onto the bus independently, i.e. without triggering or authorization by the device controlling the bus allocation or by some other device, the data to be output by them onto the bus, and can do this at the correct time.

The corresponding settings in the devices connected to the bus are expediently made before the start of the transmission of the frame or message which contains the reply field, preferably at the time of initialization of the system which takes place for example after said system is switched on. It proves advantageous if the settings can be varied during operation. This could be brought about, for example, by means of control instructions sent in appropriate frames or messages. The execution of the setting by means of frames or messages sent via the bus can be used not only when changing the settings but also when making new settings of the devices.

The corresponding settings are preferably stored in nonvolatile memories provided in the respective devices. It is then, under specific circumstances, sufficient if the settings are made only when the system is first put into operation. Furthermore, it would then also be possible without difficulty (at any rate without repeated settings of the respective devices) for the devices to go in the meantime into an energy-saving operating mode (for example what is referred to as a sleep operating mode or what is referred to as a power down operating mode) during operation.

Which device has to output which information onto the bus at which point in time can also be set permanently in the devices (for example by means of an appropriate hardware implementation of the respective devices or using jumpers).

The settings can be made uniformly (identical for all devices) or individually (differently).

The settings are made in the example in question in such a way that the content of the current frame or of a specific preceding frame or the content of the current message or of a specific preceding message, in particular the receivers of the frame or message which is specified in it is made to determine which device has to output which information onto the bus at which point in time. There is thus a frame-specific or message-specific use of the reply field.

The length of the reply field (the length of the time slot defined thereby) is not subject to any restrictions and is preferably variable; it is expediently in each case precisely as long as is necessary to be able to transmit via the bus the information which is required or desired at this point in time.

The information and/or data which the individual devices feed onto the bus within the time slot defined by the reply field can be required and evaluated by any other devices, that is to say not only by the device which sends the respective frame or the respective message. In a system which is the same as or similar to that in FIG. 1, it is, of course, possible for all devices constantly to keep track of whether information and/or data is transmitted via the bus, and if appropriate of which information and/or data this is.

By means of the reply field and the possibility of defining when which device or devices is/are to output which information onto the bus, the devices connected to the bus can obtain, with minimum effort and at maximum speed, the information which is required for satisfactory operation of the system. This minimum effort and maximum speed is due to the fact that, it is not necessary for the information fed onto the bus in the reply field to be requested in a separate frame or in a separate message and/or to be sent to the devices requiring this information;

as a result of the selectability of the devices which are intended to reply, in each case only those devices from which information is required will output information;

as a result of the selectability of the information which the selected devices are intended to feed onto the bus in the time slot defined by the reply field, only the information which is actually required is transferred; and as a result of the selectability of the points in time at which the selected devices feed onto the bus the selected information within the time slot defined by the reply field, it is possible to determine unequivocally which information it is in each case and which information originates from which device or from which group of devices.

Some of the advantages which can be obtained by means of such a data transmission method and by means of such devices are explained below with reference to a number of selected examples.

It will firstly be assumed that the device sending the frame or the message requires information indicating whether the respective frame or the respective message has been received by the receiver in a fault-free condition. This can be brought about by virtue of the fact that:

the device for which the respective frame or the respective message is intended is set in such a way that it outputs, within the time slot defined by the reply field or at a specific point in time within the time slot defined by the reply field, a positive acknowledge bit formed by a dominant bit in the example in question onto the bus if up to then it has received the frame or the message in a fault-free condition, and it does not output a positive acknowledge bit (no dominant bit) if the opposite is the case, and the devices for which the respective frame or the respective message is not intended are set in such a way that, at least at the point in time at which the device for which the respective frame or the respective message is intended, they have to acknowledge the fault-free reception of the frame or of the message by outputting a positive acknowledge bit, do not output any data onto the bus or any information indicating whether or not they have received the frame or the message in a fault-free condition up to then.

As a result, the device sending the respective frame or the respective message receives an unambiguous acknowledgement indicating whether the frame or the message has arrived in a fault-free condition at the device for which it is intended. In this way, in contrast with a CAN bus, it is not possible for the frame or the message to be sent again even though the receiver for which the respective frame or the respective message is intended has received it in a fault-free condition.

If the respective frame or the respective message is intended for a plurality of receivers it is possible to provide:

that the devices for which the respective frame or the respective message is intended are set in such a way that, at different points in time within the time slot defined by the reply field, they output a positive acknowledge bit onto the bus if they have received the frame or the message in a fault-free condition until then, and they do not output a positive acknowledge bit if the opposite is the case, and that the devices for which the respective frame or the respective message is not intended are set in such a way that, at least at the points in time at which the devices for which the respective frame or the respective message is intended must be able to acknowledge the fault-free reception of the frame or of the message by outputting a positive acknowledge bit, said devices do not output any data onto the bus, nor any information indicating whether or not they have received the frame or the message in a fault-free condition until then.

As a result, the device sending the respective frame or the respective message receives an unambiguous acknowledgement indicating whether the frame or the message has arrived in a fault-free condition at each individual device for which it is intended. The same result can be obtained, if the devices for which the respective frame or the respective message is intended are set in such a way that, within the time slot defined by the reply field or at a specific point in time within the time slot defined by the reply field, they output a negative acknowledge bit formed by a dominant bit in the example in question onto the bus if they have not received the frame or the message in a fault-free condition until then, and they do not output a negative acknowledge bit (no dominant bit) if the opposite is the case, and that the devices for which the respective frame or the respective message is not intended are set in such a way that, at least at the point in time at which the devices for which the respective frame or the respective message is intended must be able to signal the non-fault-free reception of the frame or of the message by outputting a negative acknowledge bit, they do not output any data onto the bus, nor any information indicating whether or not they have received the frame or the message in a fault-free condition until then.

As a result, the device sending the respective frame or the respective message also receives an unambiguous acknowledgement indicating whether the frame or the message has arrived in a fault-free condition at all the devices for which the respective frame or the respective message is intended. Although, if a transmission error has occurred, it is not possible to determine here which of the devices has not received the frame or the message in a fault-free condition, this is not generally significant because, of course, the frame or the message has to be transmitted again in any case.

In cases in which it is necessary for specific devices, or for all the devices for which the respective frame or the respective message is intended start the further processing of the data contained in them synchronously (at the same time or at specific time intervals), it is possible to provide that not only the device sending the frame or the message but also the devices for which the respective frame or the respective message is intended monitor the data transmitted in the reply field via the bus, and that the further processing of the data contained in the respective frame or in the respective message is not started until it is apparent from the data transmitted in the reply field via the bus that the devices which are to be operated synchronously have received the frame or the message in a fault-free condition.

It may also prove advantageous, in addition, if at least specific devices for which the respective frame or the respective message is not intended acknowledge, within the reply field, the fault-free reception of the frame or of the message or acknowledge fault-free reception. However, these acknowledgements preferably take place at a different point in time within the time slot defined by the reply field from the corresponding acknowledgement by the devices for which the respective frame or the respective message is intended. If one or more of the devices for which the respective frame or the respective message is not intended signal a faulty reception, this does not have any influence on the transmission of the current frame or of the respective message, but, in particular if it occurs frequently, it permits conclusions to be drawn as to the transmission reliability in the system, and can be interpreted as an inducement to perform maintenance or repair work or to carry out changes in the system structure or in the system components.

It may also prove advantageous if individual devices, a plurality of devices or all the devices connected to the bus are set in such a way that they output a dominant bit onto the bus at different points in time within the time slot defined by the reply field if they have received the frame or the message in a fault-free condition until then and output a dominant bit—in each case at other different points in time within the time slot defined by the reply field—if the opposite is the case. This provides the possibility of monitoring whether the respective devices are still operating satisfactorily or for example—for whatever reason—have failed. It is possible to assume that the individual devices are still operating satisfactorily if they either signal a fault-free reception or a faulty reception; if one of the devices signals neither a fault-free reception nor a reception fault, or both a fault-free reception and a reception fault, this is a sign that the respective device is no longer operating satisfactorily.

It should be apparent that individual devices, a plurality of devices or all the devices connected to the bus, including the device sending a frame or a message, can also feed onto the bus any other information during the time slot defined by the reply field (at specific points in time within that time slot). Such information is, for example, information relating to the operating mode (normal operating mode, energy-saving operating mode etc.) which the device is currently in, or some other information which could be of interest for one or a plurality of other devices.

In particular if the data to be transferred via the bus is transmitted with a very high clock frequency, it is possible to provide that the devices are provided with a relatively long time period within which they can feed onto the bus information which is to be fed onto the bus, that is to say the devices can be provided, for example, with a time period in which two or more bits can be transmitted via the bus, in order to output the bit onto the bus. As a result, it is possible to avoid faults which result from the fact that a device is no longer able to feed onto the bus, within a clock period reserved for that purpose, the information which is to be output onto the bus owing to problems with the synchronization with the common transmission clock.

The abovementioned explanations make it clear that the method described for transmitting data between devices connected via a bus makes it possible for data to be transmitted quickly, with a high level of efficiency and nevertheless with absolute reliability.

It should be apparent that the frames or messages here can also have a structure other than that illustrated in FIG. 2. They may have, in particular, more fields, fewer fields and/or fields representing different contents.

We claim:

1. A first device adapted to transmit data to at least a second and third device interconnected via a bus, wherein the first device is adapted to:
   transmit, in units, data and information concerning at least one of a transmission of the data and a use of the data to one or more second devices to which the data does not concern, and one or more third devices to which the data does concern;
   form the units with at least one region defining a given time slot within which the second and third devices output onto the bus specific information and/or data; and
   define, in the second and third devices that are configured to output acknowledgement data that acknowledges whether or not the data and information have been received by the second and third devices in a fault-free condition within the given time slot, at least one setting selected from the group consisting of:
      a setting to determine whether and under which conditions the acknowledgement data are to be output within the given time slot;
      a setting to determine which acknowledgement data is to be output within the given time slot; and
      a setting to determine at which points in time within the given time slot the acknowledgement data is to be output.

2. The device of claim 1, wherein the first device is adapted to determine the at least one setting before beginning transmission of the unit containing the given time slot.

3. The device of claim 1, wherein the first device is adapted to define the at least one setting in the respective second and third devices via the bus.

4. The device of claim 1, wherein the units comprise frames.

5. The device of claim 4, wherein each of the frames comprise one or more fields selected from the group consisting of:
   a SYN field;
   an ID field;
   a CTRL field;
   a DATA field;
   a CRC field; and
   a REPLY field.

6. The device of claim 5, wherein the units are transmitted serially.

7. The device of claim 6, wherein the frame comprises each of the fields SYN, ID, CTRL, CRC, and REPLY.

8. The device of claim 6, wherein the frames are transmitted at a specific transmission clock rate.

9. The device of claim 1, wherein the units for transmitting the data and the information concerning the transmission or the use of the data are messages.

10. The device of claim 6, wherein the first device is adapted to transmit the data via the bus at a very high clock frequency, and wherein the at least one second device and at least one third device output the acknowledgement data within a time period that is relatively long compared to a time period of the data transferred at the very high clock frequency by the first device.

11. The device of claim 10, wherein the first device is adapted to determine, based on the data and information concerning the transmission or the use of the data that is contained in the frames, which of the second and third devices output the acknowledgement data to the bus.

12. The device of claim 1, wherein the first device is adapted to define the given time slot for transmission of the acknowledgement data via the bus.

13. The device of claim 7, wherein the acknowledgement data to be output onto the bus during the given time slot comprises a positive acknowledge bit that indicates that one or more of the at least one second device and the at least one third device have previously received in a fault-free condition the data and the information concerning at least one of the transmission of the data and the use of the data transmitted via the bus.

14. The device of claim 13, wherein the one or more second and third devices which are connected to the bus are configurable to be set to acknowledge the fault-free reception of the data by outputting a positive acknowledge bit onto the bus.

15. A first device adapted to transmit data between devices interconnected via a bus, wherein the first device is adapted to:
   transmit, in frames, data, and transmission information that concerns at least one of a transmission and a use of the data, from the first device to one or more second devices, to which the data is not intended, and one or more third devices, to which the data is intended;
   form the frames with a time slot within which the one or more second and third devices output onto the bus data acknowledging whether or not the data and the transmission information in a frame have been received by the second and third devices in a fault-free condition within the given time slot; and
   determine, in the at least one second device, a setting to determine which of the one or more second devices have to output acknowledgement data within the given time slot.

16. The first device of claim 15, wherein the frame comprises one or more fields selected from the group consisting of:
   a SYN field;
   an ID field;
   a CTRL field;
   a DATA field;
   a CRC field; and
   a REPLY field.

17. The first device of claim 16, wherein the setting causes one or more second devices to not output any information acknowledging whether the data and the transmission information from the first device have been received in a fault-free condition.

18. The first device of claim 16, wherein the first device is configured such that a content of the current frame indicates at which point in time the acknowledgement data is output onto the bus.

19. A device adapted to transmit data to at least one second device and at least one third device interconnected via a bus, wherein the device is adapted to:
    transmit, via the bus, at least one frame that comprises data and information concerning at least one of a transmission and a use of the data, from the device to one or more second devices, to which the data is not intended, and one or more third devices, to which the data is intended;
    form the at least one frame such that it indicates a time slot within which the one or more second and third devices will output onto the bus data acknowledging that the data and information in a frame have been received by the second and third devices in a fault-free condition within the given time slot; and
    send, to at least one of the one or more second devices and the one or more third devices, at least one setting that indicates whether acknowledgement data is to be output within the given time slot.

20. The device of claim 19, wherein an at least one of the one or more second devices and the one or more third devices interconnected via the bus to the device is adapted to go into an energy-saving operating mode during operation.

21. The device of claim 19, wherein the first device is adapted to send the at least one setting via the bus.

22. The device of claim 21, wherein the at least one setting indicates that one or more of the at least one second device and the at least one third device is to go into an energy-saving operating mode during operation.

23. The device of claim 20 wherein at least one of the one or more second devices to which the data is not intended are adapted to be set such that when the one or more third devices to which the data is intended output acknowledgement data, the one or more second devices will not output any acknowledgement data.

24. A first device adapted to transmit data to at least one second device interconnected via a bus, wherein the device comprises:
    means for transmitting, in frames, data from the device to at least one second device together with information concerning transmission of the data;
    means for forming the frames at least partly with at least one region defining a given time slot within which at least one second device can output onto the bus specific information; and
    means for receiving from the at least one second device configured to output acknowledgement data, acknowledging whether or not the data from the first device have been received by the at least one second device in a fault-free condition within the given time slot; and
    means for sending one or more settings selected from the group consisting of:
        a setting that indicates which second device or devices may output acknowledgement data within the given time slot; and
        a setting to determine at which points in time within the time slot the data are to be output.

25. A system, comprising:
    a bus;
    a first device, at least one second device, and at least one third device coupled to the bus;
    wherein the first device is configured to output, to the bus, at least one frame that includes data intended for the at least one third device as well as information concerning the transmission of the data, wherein the data is not intended for the at least one second device;
    wherein the at least one frame defines a time slot in which the at least one second device and the at least one third device acknowledge receipt of the at least one frame in a fault-free condition; and
    wherein the at least one frame further defines at least one setting selected from the group consisting of:
        whether an acknowledgement is to be output within the indicated time slot;
        under which conditions an acknowledgement is to be output within the indicated time slot; and
        at what point in time within the give time slot an acknowledgement is to be output.

26. A system, comprising:
    a bus;
    a first device, at least one second device, and at least one third device coupled to the bus;
    wherein the first device is configured to output, to the bus, at least one frame that includes data intended for the at least one third device as well as information concerning the transmission of the data, wherein the data is not intended for the at least one second device;
    wherein the at least one frame defines a time slot in which the at least one second device and the at least one third device acknowledges receipt of the at least one frame in a fault-free condition; and
    wherein the at least one frame further defines at least one setting that causes one or more of the at least one second device and the at least one third device to enter a sleep mode of operation.

* * * * *